United States Patent [19]
Manley et al.

[11] Patent Number: 5,675,054
[45] Date of Patent: Oct. 7, 1997

[54] LOW COST THERMAL COUPLING IN ETHYLENE RECOVERY

[76] Inventors: David Manley, 11480 Cedar Grove La.; Hazem Haddad, 825 S. Bishop Ave., Apt. 11, both of Rolla, Mo. 65401

[21] Appl. No.: 503,486

[22] Filed: Jul. 17, 1995

[51] Int. Cl.$^6$ ............... C07C 7/00; C10G 49/22; B01D 3/00
[52] U.S. Cl. ............... 585/809; 208/102; 208/103; 208/104; 208/354; 208/358; 203/71; 203/74; 203/75; 203/81; 203/82; 203/84
[58] Field of Search ............... 585/809; 208/102, 208/103, 104, 354, 355, 358; 62/630; 203/71, 74, 75, 81, 82, 84

[56] References Cited

U.S. PATENT DOCUMENTS 2,295,256   9/1942   Brugma ............... 208/354

*Primary Examiner*—Glenn A. Caldarola
*Assistant Examiner*—In Suk Bullock
*Attorney, Agent, or Firm*—Daniel N. Lundeen

[57] ABSTRACT

The invention is a process for reducing capital and energy costs in ethylene recovery. Moderate pressure processing and thermally coupled fractionation steps are achieved through the use of integrator columns. Ethylene separation from cracked gas originating from ethane through gas oil feeds can now be done with thermodynamically efficient fractionation at capital cost competitive with low efficiency designs. Acetylene hydrogenation may be done before demethanization where desired, and dephlegmation is preferred to accomplish high-efficiency rectification of hydrogen and methane from ethylene. Open loop heat pumps can optionally be incorporated into the ethane/ethylene splitter fractionation step, whose desirability is controlled by optimization of capital and energy costs.

21 Claims, 6 Drawing Sheets

LOW COST THERMAL COUPLING IN ETHYLENE RECOVERY

BACKGROUND OF THE INVENTION

The general principals for the conceptual design of distillation process are given by King (1980), and conventional configurations for ethylene recovery processes are described by Kniel et. al. (1980). However, the most economical, operational, and reliable configurations for the recovery of ethylene and byproducts from pyrolyzed hydrocarbons have not been established. This is because these configurations depend on the composition of the feed, the product specifications, the relative volatilities of the chemicals, the process operating conditions, the materials of construction, the auxiliary utility systems, equipment reliability, and many other considerations. The most prominent among these considerations has been the perception that achieving fractionation trains with significantly higher thermodynamic efficiency requires additional equipment whose capital costs make the efficiency gains unattractive.

The general theory describing the thermodynamically optimal configuration for the separation by distillation of multicomponent mixtures of chemicals with nearly ideal solution behavior has been published by Petyluk et. al. (1965), Zonyo (1974), and Franklin and Wilkinson (1982). Kaiser and Picciotti (1988) have shown a generalized ethylene recovery process using distributed distillation based on their interpretation of the above thermodynamic theory. However, ethane/ethylene distribution in the fractionation columns is not discussed in Kaiser and Picciotti's article. This omission is significant to the skilled person since that fractionation step consumes a major portion of the fractionation train's cryogenic utilities. A discussion of cracked gas fractionation without mention of the ethane/ethylene separation avoids its most important step, i.e., obtaining the final product in currently acceptable purity.

U.S. Pat. No. 2,180,435 (Schlitt '435) describes a cracked gas separation process incorporating a front-end distillation column which separates methane from propylene. The ethane and ethylene in the cracked gas are directed both to the overhead and bottoms products of the front-end column without description of the desired relative separation of those components. No component or total material balances are given, nor are heating and refrigeration duties, although the patent states that the process described is ". . . a simple and efficient means for obtaining ethylene and other constituents from cracked gases in a state of commercial purity." (col. 4, 11.5–7). The commercial purity of ethylene in the time of Schlitt '435 (1938) is hardly applicable to the demands of today's polymer manufacturer. Schlitt '435 shows no acetylene removal from the ethylene product, a critical step to obtaining current commercial purity and a step whose placement controls significant overall fractionation train efficiency.

U.S. Pat. No. 4,496,381 (Norenburg '381) describes an ethylene recovery process incorporating a front-end distillation column which fractionates hydrogen from ethylene while distributing methane between the overhead and bottoms products.

U.S. Pat. No. 4,720,293 (Rowles et. al. '293) describes a cracked gas demethanizing step which also separates hydrogen from ethylene while distributing methane between the overhead and bottoms products. A liquid ethane product is mixed with the methane and hydrogen stream to generate refrigeration utilities at a lower temperature level than that to obtained from a pure ethane stream.

U.S. Pat. No. 4,900,347 (McCue et. al. '347) describes a cracked gas separation process incorporating a first distillation column to separate hydrogen from propylene and distributing ethane, ethylene and methane in the overhead and bottoms products. A second distillation column further separates the hydrogen-containing stream so that hydrogen and methane are separated from ethane and ethylene. A third distillation column further separates the propylene-containing stream from the first distillation column so that ethane and ethylene are separated from propylene. The bottom product of the second distillation column and the overhead product of the third column are then introduced at different stages to a ethane/ethylene splitter (hereafter referred to as the C2 splitter).

U.S. Pat. No. 5,035,732 (McCue '732) describes a further development of McCue '347 so that the second distillation column operates at a substantially lower pressure than the first distillation column.

U.S. Pat. No. 5,253,479 (Di Cintio et. al. '479) describes a demethanization step producing a bottoms product containing primarily liquid ethylene and ethane, so that a first part of that liquid stream is used in an absorption column to absorb ethylene and propylene from a gas stream consisting mainly of hydrogen and methane. A second part of the liquid stream is used to reflux a deethanizer, and a third part of the liquid stream is sent to a C2 splitter.

Nowhere in the prior art has methane, in a single fractionation step, been substantially completely fractionated from ethane with ethylene being distributed into the overhead and bottoms products.

Nowhere in the prior art have recycle flows between major fractionation columns in cracked gas fractionation been used to reduce the minimum reflux requirements of downstream columns.

SUMMARY OF THE INVENTION

An ethylene integrator column is used to perform a "product-quality" fractionation of methane from ethane with ethylene being distributed between the overhead and bottom products. The overhead product of the ethylene integrator column is fractionated in a demethanizer where the bottom product will meet ethylene product specifications for ethane content. The bottoms product of the ethylene integrator column is fractionated in an ethane/ethylene splitter, whose overhead product will meet ethylene product specifications for methane content.

"Product-quality" thus refers to the degree of separation to be achieved in the ethylene or other such integrator column to meet ethylene or other product specifications (1) in the bottoms stream of the downstream demethanizer or other similarly functioning fractionation step and (2) in the overhead stream of the downstream ethane/ethylene splitter or other similarly functioning fractionation step. Product-quality separation concerns distribution of one or two components into the overhead and bottoms streams of a fractionation column so that the bottoms stream of one downstream fractionation can be combined with the overhead stream of another downstream fractionation such that the combined stream meets desired product qualities. Prior art processes have heretofore not realized the savings in capital and energy costs to be derived from such integration of the stripping section of one fractionator and the enriching section of another.

"Integrator column" refers to a previously unrealized fractionation concept that reduces overall capital and energy costs by enabling economic integration and thermal coupling of cracked gas fractionation train columns by performing the product-quality separations. It has been discovered that application of the integrator column is also highly effective in reducing capital and energy costs of the other fractionation steps in the fractionation train for cracked gas, not only the separation of ethylene from ethane and methane in the demethanizer and the ethane/ethylene splitter.

Upstream of the ethylene integrator column, its feed stream (or feed streams where other fractionation or feed sources other than cracked gas are used) has been compressed, treated to remove acid gases, dried, and acetylene has been reduced to meet product specifications for acetylene and total impurities. The feed stream contains primarily hydrogen, methane, ethylene, and ethane with trace amounts of propylene and other impurities. Excluding ethylene fed to the ethylene integrator column from recycle streams, preferably from thirty to fifty percent of the ethylene ultimately to be recovered as product is distributed to the overhead product of the ethylene integrator column and sent to the demethanizer. The ethane/ethylene splitter column required for final ethylene product recovery is greatly reduced in size and requires considerably less energy to operate than in prior art processes.

In an improvement of the above concept, a liquid sidedraw on or near the feed stage of the demethanizer column for the overhead stream from the ethylene integrator column provides the reflux liquid to the upstream ethylene integrator column. This thermal coupling through recycle flow accomplishes the refluxing duty for the ethylene integrator column and eliminates the condenser for that column.

A further, equally important advantage is obtained from eliminating the ethylene integrator column condenser. It is a necessary, although thermodynamically disadvantageous, requirement for that column's condenser to excessively subcool the demethanizer column feed due to the hydrogen and methane content of the ethylene integrator column overhead product. When subcooling is not required, the demethanizer feed temperature can then match that of the optimum feed stage of the demethanizer, will thus significantly reduce the methane solubility in ethylene on the demethanizer column feed stage, and consequently reduce the minimum reboil requirement of the demethanizer. The higher temperatures at the coldest part of the column then allows use of less expensive materials of construction for the ethylene integrator column. One or more intercondensers in the enriching section of the demethanizer can then be used to remove heat at maximum and thermodynamically optimum temperatures. A dephlegmator may be used in place of all or part of the enriching section of the demethanizer column to improve heat integration. The prior art describes demethanizer systems including fairly complex heat integration designs. The term "demethanizer" in connection with the present invention generally includes the many prior art methods to accomplish demethanization of cracked gas that are capable or adaptable to generating a liquid bottoms stream relatively free of methane. For the present invention, such a demethanizer will generate a liquid bottoms stream that meets ethylene product specifications for methane.

The overhead product from the demethanizer column containing primarily hydrogen and methane may be further processed to recover separate hydrogen and fuel gas products. These products, whether separated or not, preferably provide part of the cooling necessary in the demethanizer column enriching section. A refrigeration system is used to provide the net cooling duty required in the demethanizer column enriching section. As described above, the several demethanizer systems also include a wide variety of refrigeration systems for accomplishing recovery of ethylene from the hydrogen-rich gases as well as hydrogen purification from methane. It is within the scope of the present invention to use any such configurations that will accomplish the fractionation necessary to produce the above described liquid ethylene bottoms stream from the demethanizer.

The bottom product from the ethylene integrator column feeds an ethane/ethylene splitter distillation column which fractionates ethylene from ethane, so that the ethylene loss in the bottom product is economically controlled, and the ethylene recovered in the overhead product meets the specification for ethane content. A vapor side draw on or near the feed stage of the ethane/ethylene splitter provides the reboil vapor to the upstream ethylene integrator column. This thermal coupling through recycle flow eliminates the reboiler on the ethylene integrator column, reduces the temperature of the ethane/ethylene splitter column feed stage, and consequently reduces the minimum reflux requirements of the ethane / ethylene splitter column. An interreboiler in the stripping section of the ethane/ethylene splitter column may be used to add heat at a minimum temperature. Open loop heat pumping of the ethane/ethylene splitter column with either the overhead or bottom product may be used to improve heat integration and reduce the need for external refrigeration.

A vapor overhead product from the ethane/ethylene splitter column may be used to provide at least part of the reboiling duty to the demethanizer. This thermal coupling through recycle flow eliminates the demethanizer reboiler, reduces capital costs, and improves thermodynamic efficiency. The liquid net overhead product from the ethane/ethylene splitter column is combined with the liquid bottom product from the demethanizer column to constitute the specification ethylene product from the process which is normally pumped to pipeline pressure and heated to recover its refrigeration value. The liquid ethane bottom product from the ethane/ethylene splitter column is normally reduced in pressure and heated to recover its refrigeration value.

Heat pumping of the ethane/ethylene splitter may be eliminated in some cases to obtain savings in equipment cost in the present invention. The condensing duty of the ethane/ethylene splitter must then be supplied in part by external refrigeration. In that case, it may be most advantageous to feed all of the liquid bottoms product of the demethanizer as reflux to the top of the ethane/ethylene splitter to reduce refrigeration utilities. A part of the overhead vapor stream from the ethane/ethylene splitter will be condensed to provide reflux to that column. Another part of the overhead vapor stream may optionally be fed to the bottom of the demethanizer to provide all or part of its reboiling duty. The remainder of that overhead vapor stream will be compressed to a pressure desired for pipeline transfer and sent to its consumer.

When the feed to the pyrolysis reactors is relatively pure ethane, then the cracked gas contains relatively small amounts of propylene and heavier hydrocarbons in comparison with higher molecular weight pyrolysis feeds such as petroleum naphtha. In the feed cases where the amount of propylene and heavier components reach unacceptably high levels in the bottom product of the ethane/ethylene splitter, the ethylene integrator column is preferably fed by the overhead product from an upstream deethanizer which fractionates the ethane and lighter components from the propylene and heavier hydrocarbons. The ethane recovered from the deethanizer overhead product will be sufficiently free of propylene and heavier components so that the ethane product can be used for furnace recycle or other processing. The deethanizer bottom product will meet downstream product specifications for ethane content. The feed to the deethanizer column has been compressed, treated to remove acid gases, dried, and cooled to approximately its dewpoint. A liquid side draw on or near the feed stage of the downstream ethylene integrator column provides the reflux to the deethanizer column. This thermal coupling through recycle, as shown advantageously for the ethylene integrator column, eliminates the condenser in the deethanizer column which would excessively subcool the ethylene integrator column feed due to the hydrogen, methane, and ethylene content of the deethanizer column overhead product. Elimination of this subcooling significantly raises the temperature of the ethylene integrator column feed, reduces the methane solubility in the liquid on the ethylene integrator column feed stage, and consequently reduces the minimum reboil requirement of the ethylene integrator column. An intercondenser in the enriching section of the ethylene integrator column may be used to remove heat at a maximum and thermodynamically optimum temperature and provide the reflux to the deethanizer column. An acetylene reactor system is preferable used to hydrogenate the acetylene. The acetylene reactor system may be placed in the deethanizer column overhead product stream or in the deethanizer column feed stream.

When the feed to the pyrolysis reactors contains propane in addition to ethane, as is typical of an ethane/propane mix from a natural gas liquids recovery plant, then significant amounts of propylene and propane are included in the cracked gas in addition to hydrogen, methane, ethylene, ethane, and small amounts of heavier hydrocarbons. A deethanization may thus be required prior to cracked gas fractionation in the ethylene integrator column. However, it is well established that deethanization of cracked gas from such ethane/propane mixtures is thermodynamically disadvantageous for the following reason. In a single column deethanization of cracked gas with increasing amounts of propylene and heavier components in the column feed, propylene and propane are stripped into the deethanizer column enriching section along with the ethane, and thus the condenser duty required to recondense the propane and propylene must be supplied at unaccepably low temperatures due to the presence of the lighter gases.

In the ethane/propane feed case application of a further embodiment of the present invention, a second integrator column, named the ethane/ethylene integrator column, initially fractionates cracked gas. That column separates propylene from methane while distributing ethane and ethylene between the overhead and bottom products. The ethane recovered in the overhead product and further processed as described later meets downstream requirements for propylene content. The ethylene recovered in the bottom product and further processed as described later meets downstream product specifications for methane content. The overhead stream is fed to the ethylene integrator column, which preferably provides the ethane/ethylene integrator column with a recycle flow for reflux. The bottom stream from the ethane/ethylene integrator column is fed to a deethanizer, where the propylene and heavier components are fractionated outside of the presence of hydrogen and methane. The overhead stream from the deethanizer is fed to the ethane/ethylene splitter.

Using the same method for thermally linking the above demethanizers with the ethylene integrator column and the above ethylene integrator column with an upstream deethanizer, the ethane/ethylene integrator column is refluxed using a liquid side draw from or wear the food stage of downstream ethylene integrator column. Further thermal linking is accomplished by withdrawing a vapor stream at or near the feed stage of the deethanizer for use as reboiling vapor for the ethane/ethylene integrator column, thus eliminating the reboiler and condenser for a major fractionation column in the cracked gas fractionation train. In addition, the use of that sidedraw vapor from the deethanizer to reboil the ethane/ethylene integrator column reduces the temperature of the deethanizer column feed stage and consequently reduces the minimum reflux requirement of the deethanizer column.

The acetylene reactor system preferably processes the feed to the ethane/ethylene integrator column instead of the overhead product stream so that an effective amount of the cracked gas acetylene will be reacted.

The ethane recovered from the overhead product from the deethanizer of this ethane/ethylene integrator embodiment will meet downstream product requirements for reduced levels of propylene and heavier components. The bottom product will meet downstream product specifications for ethane content. An interreboiler in the stripping section of the deethanizer column may be used to add heat at a thermodynamically minimum temperature and improve heat integration, and an intercondenser in the enriching section may be used to remove heat at a thermodynamically maximum temperature and improve heat integration. The bottom product from the deethanizer column contains propylene, propane and heavier components may be further processed to produce additional products.

In yet a further improvement to this ethane/ethylene integrator column embodiment, two vapor streams may be fed to the bottom of the ethylene integrator column and thereby provide all or part of its reboiling duty. All or part of the overhead vapor stream of the deethanizer may be used as a first vapor stream for reboiling. A second vapor stream may be drawn from the ethane/ethylene splitter. When one or both of these vapor streams provide all the reboiling duty for the ethylene integrator column, it is clear that no reboiler equipment and associated piping will be needed, thereby reducing equipment cost.

In yet a further improvement to this ethane/ethylene integrator column embodiment, the reflux for the deethanizer column is provided by a part of the liquid bottom product from the ethylene integrator column. This thermal coupling through recycle flow eliminates the deethanizer column condenser, reduces capital costs, and improves thermodynamic efficiency.

The thermodynamic advantages to be gained by reboiling the ethylene integrator column with deethanizer overhead vapor are not simply obtained. The present inventors have found that the bottoms product of the ethylene integrator column has a slightly different ratio of ethylene to ethane compared to that ratio in the deethanizer vapor fed to the bottom ethylene integrator column. Such a discrepancy produces an inefficiency, since the desired distribution of ethylene and ethane in the ethylene integrator column is thus interfered with by the mismatch of compositions of the deethanizer overhead vapor and the ethylene integrator column bottoms. It is an unavoidable inefficiency due to the upstream fractionation of ethane and ethylene in the ethane/ethylene integrator column. To optimize the benefits of reboiling the ethylene integrator column with deethanizer vapor, the present inventors have found in some cases that all of the deethanizer vapor is preferably fed to the ethane/ethylene splitter and all the reboiling vapor for the ethylene integrator column is supplied from a side drawn vapor from the ethane/ethylene splitter from a stage where there is a composition match. In the most highly efficient design, several stages will separate the vapor and liquid feeds and side draws to accomodate the different ethane to ethylene ratios of those feeds and side draws. This optimization will be slightly more energy efficient.

When the feed to the pyrolysis reactors contains liquid hydrocarbons, such as a petroleum naphtha, then significant amounts of butadiene and heavier hydrocarbons are included in the cracked gas in addition to hydrogen, methane, ethylene, ethane, propylene, and propane. It is usually not desirable to hydrogenate the butadiene and heavier unsaturated hydrocarbons in the acetylene reactor system, so those heavier components are advantageously removed in the initial fractionation step or upstream of the acetylene reactor. In addition, it is advantageous to remove the heavier hydrocarbons prior to deethanization, since they necessarily excessively raise the temperature of the deethanizer column reboiler causing fouling and preclude good heat integration.

In the petroleum naphtha feed case, an ethane/ethylene integrator column is fed by the overhead product from an upstream propane/propylene integrator distillation column which fractionates butadiene from ethane while distributing propane and propylene between the overhead and bottom products. The propane recovered in the overhead product will meet downstream specifications for butadiene and heavier hydrocarbon content. The propylene recovered in the bottom product will meet downstream specifications for ethane and lighter hydrocarbon content. The feed to the propane/propylene integrator column has been compressed, treated to remove acid gases, dried, and cooled to approximately its dew point. A liquid side draw on or near the feed stage of the downstream ethane/ethylene integrator column provides the reflux to the propane/propylene integrator column. This thermal coupling through recycle flow eliminates the condenser on the propane/propylene integrator column which would excessively subcool the ethane/ethylene integrator column feed due to the hydrogen, methane, ethylene, and ethane content of the propane/propylene integrator column overhead product. Elimination of this subcooling significantly raises the temperature of the ethane/ethylene integrator column feed, reduces the methane solubility in the liquid on the ethane/ethylene integrator column feed stage, and consequently reduces the minimum reboil requirement of the ethane/ethylene integrator column. One or more intercondensers in the enriching section of the ethane/ethylene integrator column is used to remove heat at maximum temperatures and provide the reflux to the propane/propylene integrator column. The acetylene reactor system is placed in the propane/propylene integrator column overhead product stream so that effective amounts of acetylene and trace amounts of the propadiene and methyl acetylene are hydrogenated. The bottom product from the propane/propylene integrator column may be further processed to produce additional products.

When the feed to the pyrolysis reactors contains heavy liquid hydrocarbons, such as a petroleum gas oil from an oil refinery, then significant amounts of components of higher molecular weight(gasoline) than butane are included in the ethylene recovery process feed in addition to hydrogen, methane, ethylene, ethane, propylene, propane, butadiene, butenes, and butanes. If these higher molecular weight components are not first removed, and the above process for a petroleum naphtha pyrolysis feed is used, then the higher molecular weight components excessively raise the temperature of the propane/propylene integrator column reboiler causing fouling and precluding good heat integration.

In the petroleum gas oil feed case, the propane/propylene integrator column is fed by the overhead product from an upstream propane/propylene/butane/butene/butadiene (C3/C4+) integrator column which fractionates isoprene, pentenes, and pentanes (C5 hydrocarbons) from ethane and ethylene(C2 hydrocarbons) while distributing the C3 and C4 hydrocarbons between the overhead and bottom products, so that the C4 hydrocarbons recovered in the overhead product will meet downstream specifications for C5 hydrocarbon content and the C3 hydrocarbons recovered in the bottom product will meet downstream specifications for C2 hydrocarbon content. The feed to C3/C4+ integrator column has been compressed, treated to remove acid gases, and cooled to ambient temperature. The overhead product from the C3/C4+ integrator column is dried, compressed, and cooled to approximately its dew point before being fed to the downstream propane/propylene integrator column.

The C3/C4+ integrator column pressure is set low enough to allow a bottom temperature which precludes excessive fouling of the reboiler by the heavy unsaturated hydrocarbons. A liquid side draw on or near the feed stage of the downstream propane/propylene integrator column provides the reflux to the C3/C4+ integrator column. This thermal coupling through recycle flow eliminates the condenser on the C3/C4+ integrator column, raises the temperature of the propane/propylene integrator column feed stage, and reduces the minimum reboil requirement in the propane/propylene integrator column. An intercondenser in the enriching section of the propane/propylene integrator column may be used to remove heat at a maximum temperature and provide the reflux to the C3/C4+integrator column. The bottom product from the C3/C4+ integrator column may be further processed to produce additional products.

DESCRIPTION OF DRAWINGS

To simplify the drawings and emphasize the conceptual advantages of the new process, coolers and heaters have been used whenever heat is removed or added from the process; and the details of the associated utility systems are not shown. Also, process control valves and pumps used for overcoming gravity heads, such as distillation column reflux pumps, are omitted as are vapor liquid separator drums.

Gas compression and expansion devices are shown in the Figures.

FIG. 1A shows the ethylene integrator column and a demethanizer and an ethane/ethylene splitter without thermal coupling. FIG. 1B shows the columns of FIG. 1A with thermal coupling.

DETAILED DESCRIPTION OF THE INVENTION

Figure 1A:
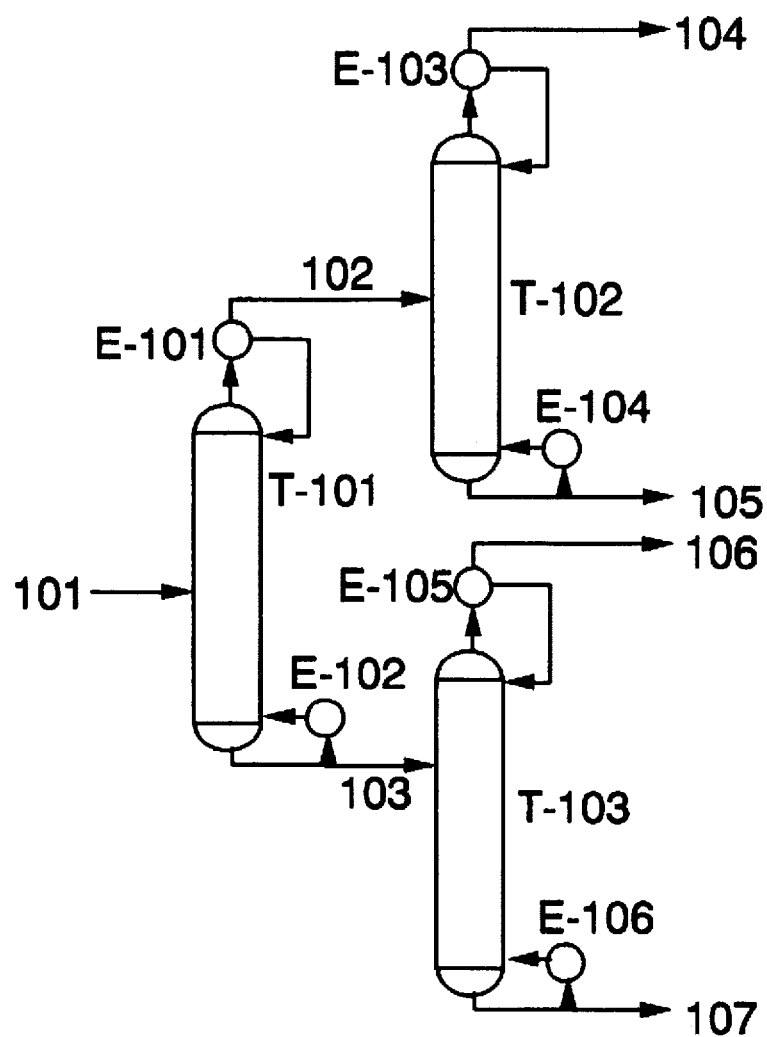
FIGS. 1A and 1B show the ethylene integrator T-101, demethanizer T-102, and ethane/ethylene splitter T-103 distillation columns. The process steps represented by these columns are common to all pyrolysis feed cases describing the present invention.
Figure 1B:
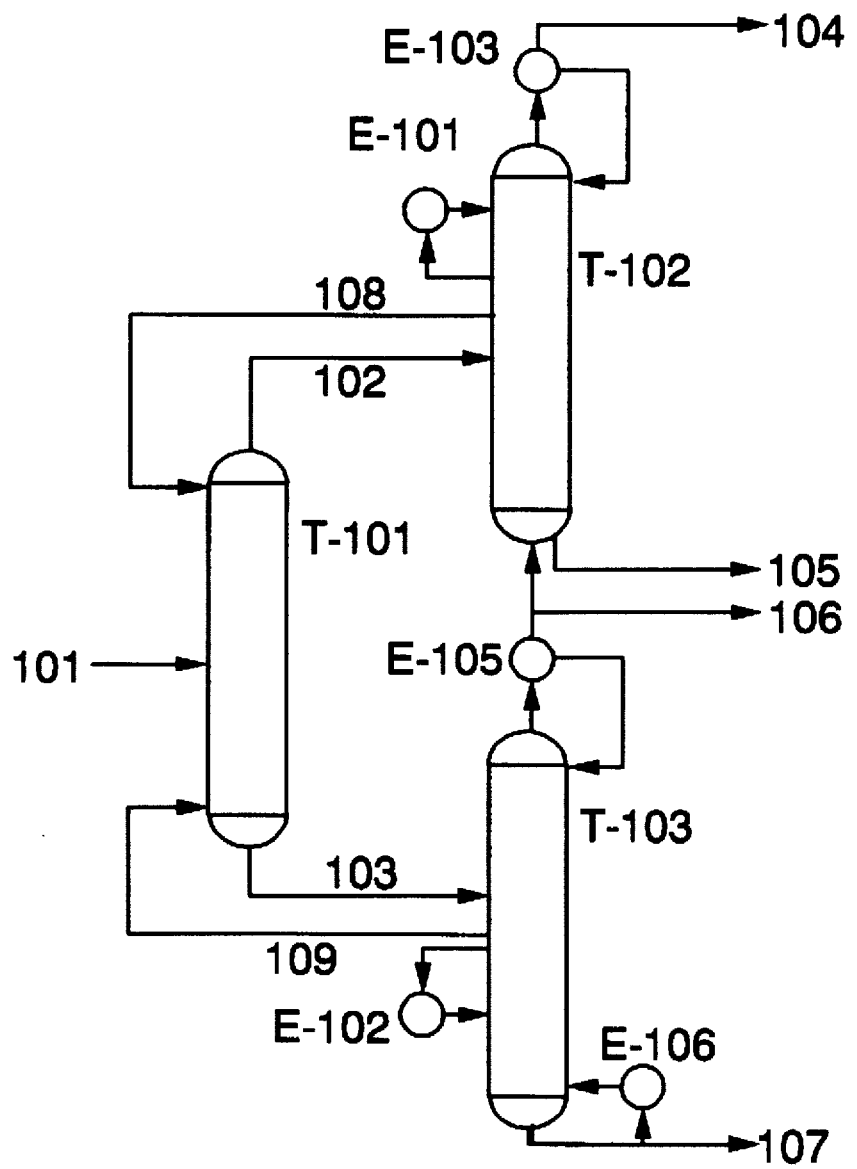

FIG. 1B shows the concepts of integrated distillation with thermal coupling through exchange of reflux flows. Optimally, about 43% of the ethylene in the feed stream 101 is ultimately recovered in the demethanizer column bottoms stream 105 and does not enter ethane/ethylene splitter T-103. Optimally, about 57% of the ethylene in the feed stream 101 is ultimately recovered in the ethane/ethylene splitter column net overhead stream 106 and does not enter the demethanizer T-102.

In FIG. 1B, the splitting of ethylene fractionation and thermal coupling between demethanizer T-102 and ethane/ethylene splitter T-103 reduces their size and energy consumption. The ethylene integrator column overhead stream 102 is about 47 degrees F warmer in the thermally coupled process of FIG. 1B than in the FIG. 1A process. This decreases the concentration of methane on the demethanizer column feed stage and reduces the reboil requirements of demethanizer T-102. The higher temperature also allows use of relatively inexpensive materials of construction in the ethylene integrator column T-101.

The ethylene integrator column bottom stream 103 is about 1.5 degrees F cooler in the thermally coupled process of FIG. 1B than in the FIG. 1A process. This decreases the concentration of ethane on the ethane/ethylene splitter T-103 feed stage and reduces its reflux requirements. The demethanizer column T-102 in the thermally coupled process of FIG. 1B is reboiled using a vapor stream 110 taken from the gross overhead product stream 111 of the ethane/ethylene splitter T-103. This eliminates the demethanizer column reboiler E-104 and reduces the size of the ethane/ethylene splitter column condenser E-105. A comparison of the overall results of all these effects has shown that the thermally coupled process of FIG. 1B reduces the costs of capital and energy than the process of FIG. 1A. In addition, the process of FIG. 1A is more cost effective than the processes of the prior art. Material balances and process conditions for the processes in FIGS. 1A and 1B are given in the following Tables 1A and 1B respectively.

TABLE 1A

MATERIAL BALANCE FOR
ETHYLENE RECOVERY BY DISTRIBUTED DISTILLATION

| Stream | 101 | 102 | 103 | 104 | 105 | 106 | 107 |
|---|---|---|---|---|---|---|---|
| Vap. Frac. | 1.00 | 1.00 | 0.00 | 1.00 | 0.00 | 1.00 | 0.00 |
| Temp., F. | −28.6 | −98.1 | 3.5 | −233.2 | −17.6 | −17.4 | 25.0 |
| Pres., Psia | 306.5 | 299.2 | 309.4 | 295.9 | 301.6 | 301.6 | 316.3 |
| Flow, Lbmol/hr | 12,926 | 7,006 | 5,919 | 5,127 | 1,879 | 2,501 | 3,418 |
| Flow, Mlb/hr | 245.6 | 72.5 | 173.1 | 19.8 | 52.7 | 70.2 | 102.9 |
| Comp., Mol % | | | | | | | |
| Hydrogen | 34.49% | 63.63% | 0.00% | 86.95% | 0.00% | 0.00% | 0.00% |
| Methane | 5.16% | 9.49% | 0.02% | 12.95% | 0.05% | 0.05% | 0.00% |
| Ethylene | 34.03% | 28.86% | 42.50% | 0.10% | 99.90% | 99.90% | 0.50% |
| Ethane | 26.20% | 0.01% | 57.19% | 0.00% | 0.05% | 0.05% | 99.01% |
| Propene | 0.13% | 0.00% | 0.28% | 0.00% | 0.00% | 0.00% | 0.48% |
| Propane | 0.00% | 0.00% | 0.01% | 0.00% | 0.00% | 0.00% | 0.01% |

TABLE 1B

MATERIAL BALANCE FOR
ETHYLENE RECOVERY BY THERMALLY COUPLED DISTRIBUTED DISTILLATION

| Stream | 101 | 102 | 103 | 104 | 105 | 106 |
|---|---|---|---|---|---|---|
| Vap. Frac. | 1.00 | 1.00 | 0.00 | 1.00 | 0.00 | 1.00 |
| Temp., F. | −28.6 | −50.9 | 2.0 | −233.3 | −17.0 | −16.9 |
| Pres., Psia | 306.5 | 302.1 | 309.0 | 295.4 | 304.1 | 304.1 |
| Flow, Lbmol/hr | 12,926 | 14,845 | 8,264 | 5,127 | 2,638 | 1,743 |
| Flow, Mlb/hr | 245.6 | 289.2 | 241.0 | 19.8 | 74.0 | 48.9 |
| Comp., Mol % | | | | | | |
| Hydrogen | 34.49% | 30.52% | 0.00% | 86.95% | 0.00% | 0.00% |
| Methane | 5.16% | 5.22% | 0.02% | 12.95% | 0.05% | 0.06% |
| Ethylene | 34.03% | 64.23% | 46.12% | 0.10% | 99.90% | 99.89% |
| Ethane | 26.20% | 0.03% | 53.64% | 0.00% | 0.05% | 0.05% |
| Propene | 0.13% | 0.00% | 0.21% | 0.00% | 0.00% | 0.00% |
| Propanane | 0.00% | 0.00% | 0.01% | 0.00% | 0.00% | 0.00% |

| Stream | 107 | 108 | 109 | 110 | 111 |
|---|---|---|---|---|---|
| Vap. Frac. | 0.00 | 0.00 | 1.00 | 1.00 | 1.00 |

TABLE 1B-continued

MATERIAL BALANCE FOR
ETHYLENE RECOVERY BY THERMALLY COUPLED DISTRIBUTED DISTILLATION

| Temp., F. | 25.9 | −50.3 | 3.2 | −16.9 | −16.9 |
|---|---|---|---|---|---|
| Pres., Psia | 320.2 | 302.1 | 313.9 | 304.1 | 304.1 |
| Flow, Lbmol/hr | 3,418 | 7,845 | 2,338 | 765 | 2,508 |
| Flow, Mlb/hr | 102.9 | 216.9 | 67.7 | 21.5 | 70.3 |
| Comp., Mol % | | | | | |
| Hydrogen | 0.00% | 0.92% | 0.00% | 0.00% | 0.00% |
| Methane | 0.00% | 1.41% | 0.01% | 0.06% | 0.06% |
| Ethylene | 0.50% | 97.62% | 55.14% | 99.89% | 99.89% |
| Ethane | 99.01% | 0.05% | 44.81% | 0.05% | 0.05% |
| Propene | 0.48% | 0.00% | 0.03% | 0.00% | 0.00% |
| Propanane | 0.01% | 0.00% | 0.00% | 0.00% | 0.00% |

Figure 2:
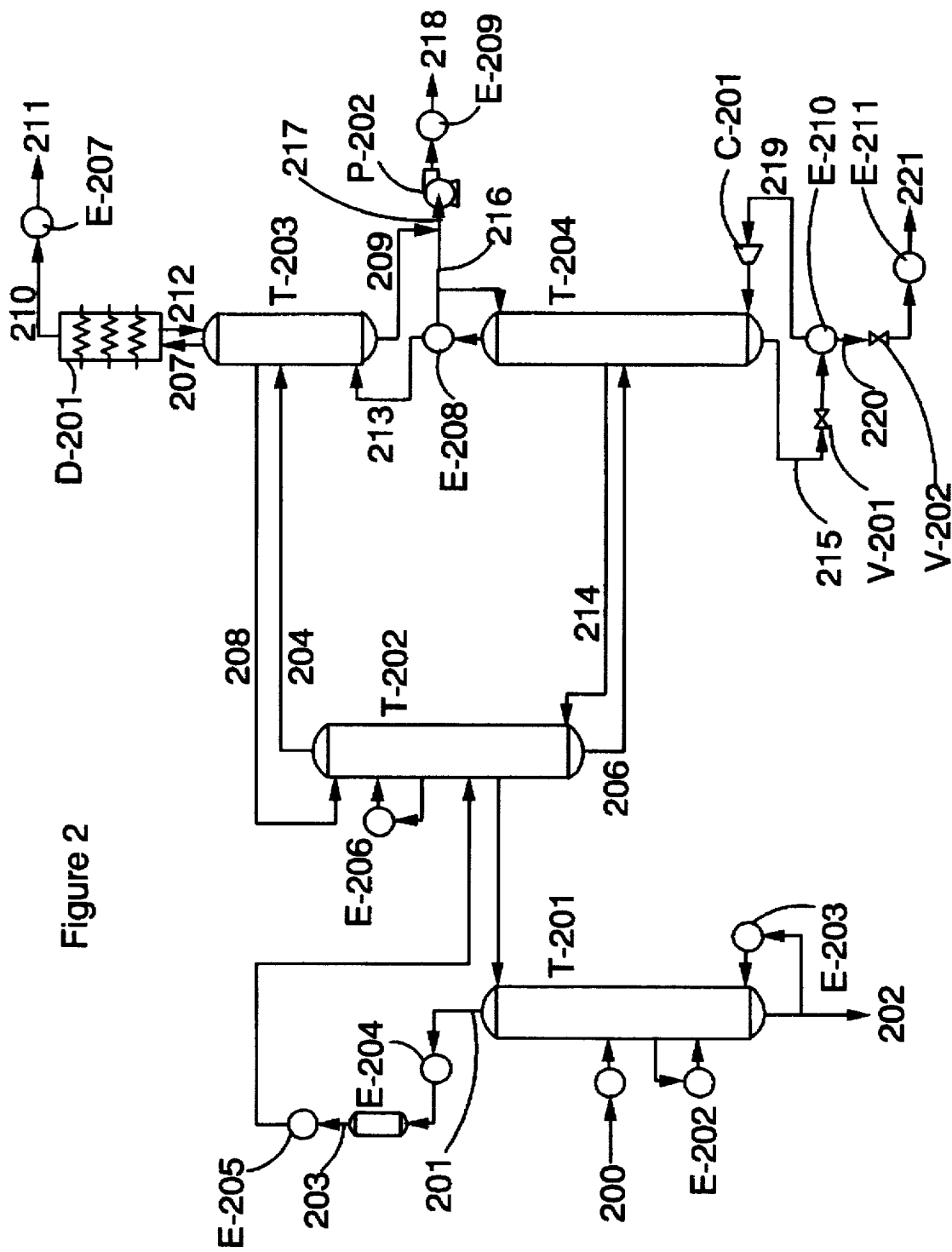
FIG. 2 shows the invention of FIG. 1B incorporating a thermally coupled deethanizer, although the demethanizer refrigeration system is provided primarily by dephlegmation instead of single or multiple stage condensations. The ethane/ethylene splitter is provided with an open loop heat pump at the bottom of the column.

In FIG. 2, the deethanizer T-204 is refluxed through thermal coupling with the ethylene integrator column T-202. A dephlegmator D-201 replaces all or a portion of the enriching section of the demethanizer T-203. An open loop heat pump drives the ethane/ethylene splitter T-204. The following Table 2 describes the material balances and process conditions for the process shown in FIG. 2.

TABLE 2

MATERIAL BALANCE FOR ETHYLENE RECOVERY FROM PYROLYZED ETHANE

| Stream | 200 | 201 | 202 | 203 | 204 | 205 | 206 | 207 | 208 | 209 | 210 |
|---|---|---|---|---|---|---|---|---|---|---|---|
| Vap. Frac. | 1.00 | 1.00 | 0.00 | 1.00 | 1.00 | 0.00 | 0.00 | 1.00 | 0.00 | 0.00 | 1.00 |
| Temp., F. | 50.0 | -25.5 | 207.2 | 101.5 | -49.2 | -27.6 | 3.8 | -48.7 | -48.7 | -17.0 | -233.0 |
| Pres., Psia | 335.4 | 330.9 | 335.6 | 312.9 | 302.1 | 309.9 | 312.4 | 302.1 | 302.1 | 304.1 | 300.0 |
| Flow, Lbmol/hr | 13,115 | 15,352 | 164 | 15,327 | 15,630 | 2,401 | 7,864 | 16,076 | 8,372 | 3,062 | 5,128 |
| Flow, Mlb/hr | 254.6 | 315.0 | 8.9 | 315.0 | 311.1 | 69.4 | 229.8 | 322.2 | 231.6 | 85.9 | 19.8 |
| Comp., Mol % | | | | | | | | | | | |
| Hydrogen | 34.18% | 29.32% | 0.00% | 29.21% | 29.00% | 0.78% | 0.00% | 28.35% | 0.89% | 0.00% | 86.94% |
| Methane | 5.08% | 4.52% | 0.00% | 4.53% | 4.99% | 1.15% | 0.02% | 5.22% | 1.38% | 0.05% | 12.96% |
| Acetylene | 0.19% | 0.16% | 0.00% | 0.00% | 0.00% | 0.00% | 0.00% | 0.00% | 0.00% | 0.00% | 0.00% |
| Ethylene | 33.35% | 34.92% | 0.00% | 35.13% | 65.98% | 41.08% | 43.59% | 66.41% | 97.69% | 99.90% | 0.10% |
| Ethane | 25.82% | 30.93% | 0.02% | 30.98% | 0.03% | 56.73% | 56.15% | 0.02% | 0.05% | 0.05% | 0.00% |
| M-Acetylene | 0.00% | 0.00% | 0.37% | 0.00% | 0.00% | 0.00% | 0.00% | 0.00% | 0.00% | 0.00% | 0.00% |
| Propadiene | 0.00% | 0.00% | 0.36% | 0.00% | 0.00% | 0.00% | 0.00% | 0.00% | 0.00% | 0.00% | 0.00% |
| Propene | 0.51% | 0.15% | 30.68% | 0.15% | 0.00% | 0.26% | 0.22% | 0.00% | 0.00% | 0.00% | 0.00% |
| Propane | 0.07% | 0.01% | 5.63% | 0.01% | 0.00% | 0.01% | 0.01% | 0.00% | 0.00% | 0.00% | 0.00% |
| C4 & Heavier | 0.77% | 0.00% | 62.94% | 0.00% | 0.00% | 0.00% | 0.00% | 0.00% | 0.00% | 0.00% | 0.00% |

| Stream | 211 | 212 | 213 | 214 | 215 | 216 | 217 | 218 | 219 | 220 | 221 |
|---|---|---|---|---|---|---|---|---|---|---|---|
| Vap. Frac. | 1.00 | 0.00 | 1.00 | 1.00 | 0.00 | 0.00 | 0.00 | 1.00 | 1.00 | 0.00 | 1.00 |
| Temp., F. | 95.0 | -50.9 | -17.0 | 4.0 | 25.3 | -16.9 | -17.0 | 95.0 | -22.0 | -22.0 | 95.0 |
| Pres., Psia | 290.0 | 302.0 | 304.1 | 313.9 | 318.8 | 304.1 | 304.1 | 1614.7 | 154.6 | 154.6 | 108.4 |
| Flow, Lbmol/hr | 5,128 | 10,948 | 932 | 2,196 | 17,109 | 1,318 | 4,380 | 4,380 | 13,690 | 3,418 | 3,418 |
| Flow, Mlb/hr | 19.8 | 302.4 | 26.1 | 63.7 | 514.6 | 37.0 | 122.9 | 122.9 | 411.6 | 103.0 | 103 |
| Comp., Mol % | | | | | | | | | | | |
| Hydrogen | 86.94% | 0.91% | 0.00% | 0.00% | 0.00% | 0.00% | 0.00% | 0.00% | 0.00% | 0.00% | 0.00% |
| Methane | 12.96% | 1.59% | 0.14% | 0.01% | 0.00% | 0.01% | 0.04% | 0.04% | 0.00% | 0.00% | 0.00% |
| Acetylene | 0.00% | 0.00% | 0.00% | 0.00% | 0.00% | 0.00% | 0.00% | 0.00% | 0.00% | 0.00% | 0.00% |
| Ethylene | 0.10% | 97.46% | 99.82% | 53.00% | 0.78% | 99.94% | 99.91% | 99.91% | 0.85% | 0.49% | 0.49% |
| Ethane | 0.00% | 0.03% | 0.04% | 46.95% | 99.01% | 0.06% | 0.05% | 0.05% | 99.02% | 99.00% | 99.00% |
| M-Acetylene | 0.00% | 0.00% | 0.00% | 0.00% | 0.00% | 0.00% | 0.00% | 0.00% | 0.00% | 0.00% | 0.00% |
| Propadiene | 0.00% | 0.00% | 0.00% | 0.03% | 0.20% | 0.00% | 0.00% | 0.00% | 0.13% | 0.49% | 0.49% |
| Propene | 0.00% | 0.00% | 0.00% | 0.00% | 0.01% | 0.00% | 0.00% | 0.00% | 0.00% | 0.02% | 0.02% |
| Propane | 0.00% | 0.00% | 0.00% | 0.00% | 0.00% | 0.00% | 0.00% | 0.00% | 0.00% | 0.00% | 0.00% |
| C4 & Heavier | 0.00% | 0.00% | 0.00% | 0.00% | 0.00% | 0.00% | 0.00% | 0.00% | 0.00% | 0.00% | 0.00% |

Figure 3:
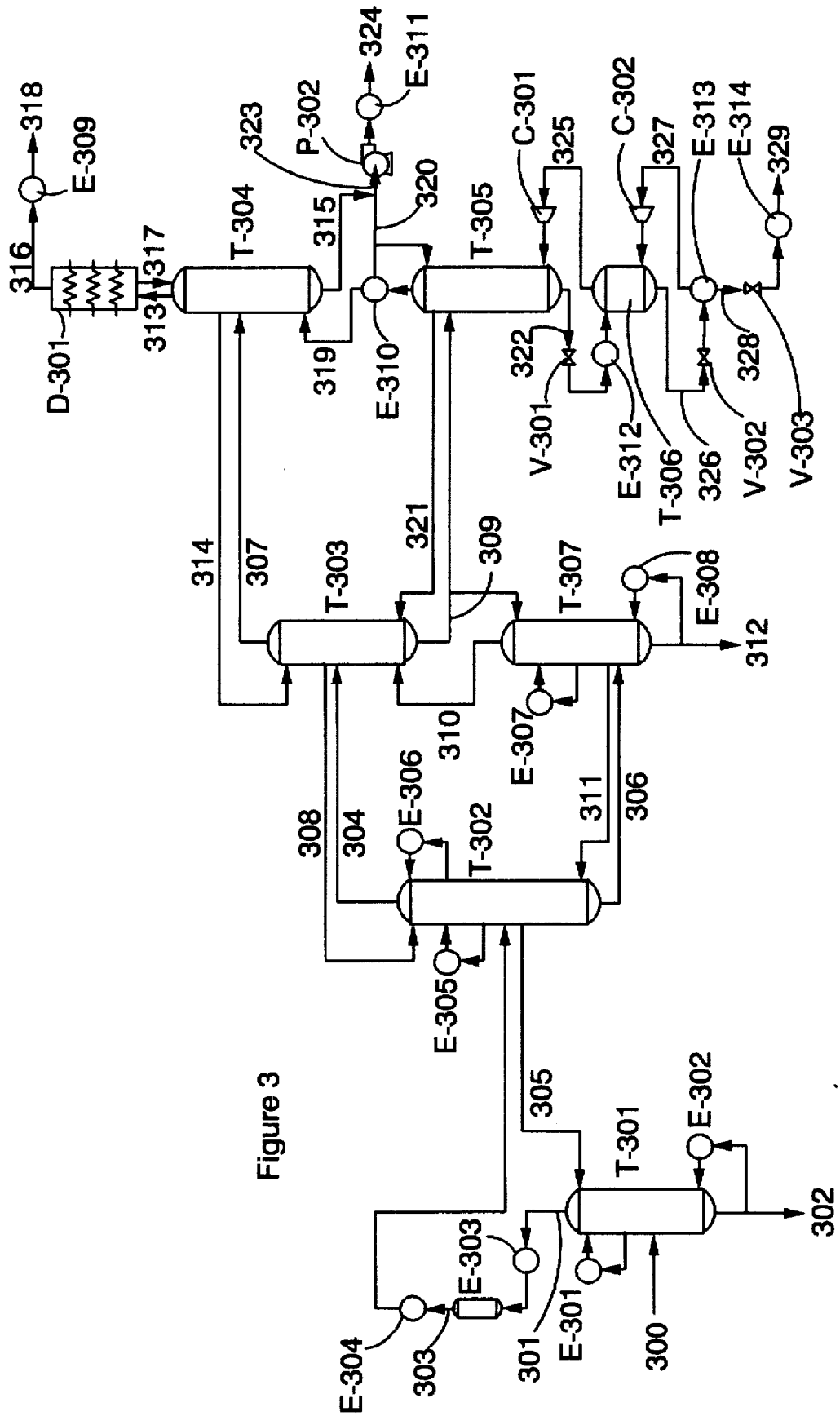
FIG. 3 shows the invention processing naphtha feed cracked gas. An initial fractionation step is done in a propane/propylene integrator column and the overhead stream is fed to an ethane/ethylene integrator column. The ethylene integrator column is thermally linked to four columns, the demethanizer, the deethanizer, the ethane/ethylene splitter, and the ethane/ethylene integrator column.

In FIG. 3, the elements of the process shown in FIG. 2 are substantially included for application to fractionation of cracked gas derived from naphtha, although the placement of the deethanizer is different for the processes of FIGS. 2 and 3. The process of FIG. 3 includes an ethane/ethylene integrator column T-302, a propane/propylene integrator column T-301, a low pressure ethane/ethylene stripper section T-306 partitioned from a high pressure ethane/ethylene splitter section T-305, and a second stage open loop heat pump compressor C-301. It is well known that the ethane to ethylene ratio is reduced significantly in naphtha-made cracked gas compared with that ratio in ethane-made cracked gas. Such a reduction in the ethane to ethylene ratio in a gas stream processed according to the present invention favors the above ethane/ethylene splitter heat pumped partition for processing naphtha-made cracked gas.

The propane/propylene integrator column T-301 is refluxed through thermal coupling with the ethane/ethylene integrator column T-302, and the acetylene reactor system R-301 is placed in the propane/propylene integrator column overhead stream 301. The ethane/ethylene integrator column T-302, which substantially replaces the deethanizer column T-202 of the FIG. 2 process, is refluxed through thermal coupling with the ethylene integrator column T-303. The deethanizer T-307 is fed from the ethane/ethylene integrator column bottoms stream 306 and is thermally coupled with both the ethane/ethylene integrator column T-302 and the ethylene integrator column T-303 through recycle flows.

A preferred embodiment of the invention for recovery of ethylene and byproducts from pyrolyzed ethane is shown in FIG. 2, and material balances and process conditions are given in Table 2. The recovery process feed stream 200 has been compressed, treated to remove acid gases, cooled, and dried using conventional technology. It contains primarily ethane, ethylene, methane, and hydrogen with small amounts of acetylene and heavier hydrocarbons. The typical composition is taken from Kniel et. al. (1980). A pressure of about 335 psia is used so that the temperatures in the downstream distillation columns T-202, T-203, and T-204 will be warm enough to avoid requiring expensive materials of construction and so that the phase equilibria and phase densities allow economic distillation column sizes. However, the process may theoretically be operated at virtually any pressure approaching ambient (20 psia) or the critical pressure of ethane (600 psia).

The feed stream 200 is further cooled to approximately its dewpoint in cooler E-201 before fractionation in the deethanizer T-201 which separates the ethane and lighter gases from the propylene and heavier components. The deethanizer T-201 is optionally and preferably interreboiled using heater E-202 at cooling water temperatures to minimize utility consumption. The remaining reboiler duty is supplied by heater E-203 using low level heat. The bottom product stream 202 from the deethanizer T-201 contains primarily propylene and heavier components with trace amounts of ethane loss. The overhead product stream 201 from the deethanizer T-201 is heated in heater E-204 to the above ambient temperature required by the acetylene reactor system R-201. The acetylene reactor system R-201 converts an effective amount of acetylene to ethylene and ethane with removal of the heat of reaction. Cooler E-205 cools the reactor product stream 203 to slightly above its dew point. The deethanizer T201 has no condenser and is optionally and preferably refluxed using recycle stream 205 from the downstream ethylene integrator column T-202.

The ethylene integrator column T-202 separates methane from ethane while distributing ethylene between the overhead and bottom product streams 204 and 206 respectively. A liquid side draw stream 205 on or near the feed stage is used to provide reflux to the upstream deethanizer T-201. An intercondenser E-206 in the ethylene integrator column T-202 at about −35 degrees F provides some of the reflux duty and improves heat integration. About 49% of the ethylene is recovered in the net overhead product and about 51% is recovered in the net bottom product from the ethylene integrator column T-202. This distribution is somewhat different than in the process of FIG. 1B because of the side draw recycle stream 205 and the intercondenser E-206. The ethylene integrator column T-202 has no condenser and is refluxed using recycle stream 208 from the downstream demethanizer distillation column. The ethylene integrator column T-202 also has no reboiler and is reboiled using recycle stream 214 from the downstream ethane/ethylene splitter T-204.

The demethanizer distillation column stripping section T-203 separates methane from the bottom product stream 209, and a dephlegmator D-201 is used as the demethanizer column enriching section to separate ethylene from the overhead product stream 210. A liquid side draw stream 208 on or near the feed stage of the demethanizer T-203 provides reflux to the upstream ethylene integrator column T-202. The dephlegmator D-201 allows heat removal at thermodynamically optimum maximum temperatures and improves heat integration.

Although not shown, several levels of refrigeration are potentially used in the dephlegmator D-201. The demethanizer stripping section T-203 has no reboiler and is reboiled using recycle stream 213 from the ethane/ethylene splitter T-204. No hydrogen recovery system is included in the process, and the demethanizer overhead product 210 is reheated in heater E-207 to ambient temperature while providing part of the cooling required in the dephlegmator D-201 and cooler E-201. A conventional hydrogen recovery system may be employed using the expansion of the pressure energy of the methane in stream 210 to provide the thermal driving force for separation. In that case two or more product streams containing relatively pure hydrogen and methane at various pressures will be reheated to ambient temperature.

The ethane/ethylene splitter T-204 separates ethane in the bottom product stream 220 from ethylene in the overhead product streams 213 and 216. A vapor side draw stream 214 on or near the feed stage of the ethane/ethylene splitter column provides reboil to the upstream ethylene integrator column T-202. The vapor overhead product stream 213 provides reboil to the demethanizer stripping section T-203, and the liquid overhead product stream 216 is combined with the demethanizer bottom product stream 209 to form the ethylene product stream 217. The combined ethylene product 217 is pumped in pump P-202 and heated in heater E-209 to pipeline pressure and ambient temperature in stream 218. An ethane open loop heat pump employing valve V-201, heater E-210, and compressor C-201 is employed on the ethane/ethylene splitter to improve heat integration and reduce capital and operation costs. However, a conventional ethane/ethylene splitter using closed loop heat pumping may be used. The ethane product stream 220 is reduced in pressure through valve V-202 and heated to ambient temperature in heater E-211.

An embodiment of the invention for fractionation of naphtha feed cracked gas is shown in FIG. 3, and material balances and process conditions are given in the following Table 3.

TABLE 3

MATERIAL BALANCE FOR ETHYLENE RECOVERY FROM PYROLYZED NAPHTHA

| Stream | 300 | 301 | 302 | 303 | 304 | 305 | 306 | 307 | 308 | 309 |
|---|---|---|---|---|---|---|---|---|---|---|
| Vap. Frac. | 1.00 | 1.00 | 0.00 | 1.00 | 1.00 | 0.00 | 0.00 | 1.00 | 0.00 | 0.00 |
| Temp., F. | 50.0 | 6.8 | 193.2 | 101.9 | -57.6 | 5.3 | 46.7 | -61.9 | -57.5 | -15.8 |
| Pres., Psia | 319.0 | 314.4 | 321.6 | 296.4 | 285.7 | 293.4 | 294.9 | 281.3 | 285.7 | 288.2 |
| Flow, Lbmol/hr | 12,307 | 13,122 | 720 | 12,965 | 12,168 | 1,534 | 2,037 | 13,136 | 2,236 | 3,811 |
| Flow, Mlb/hr | 287.6 | 305.6 | 37.2 | 305.6 | 254.6 | 55.2 | 74.2 | 275.8 | 60.6 | 108.2 |
| Comp., Mol % | | | | | | | | | | |
| Hydrogen | 13.28% | 12.49% | 0.00% | 11.43% | 12.20% | 0.30% | 0.00% | 11.39% | 0.33% | 0.00% |
| Methane | 31.91% | 30.51% | 0.00% | 30.88% | 34.02% | 5.03% | 0.02% | 34.10% | 9.50% | 0.04% |
| Acetylene | 0.96% | 0.90% | 0.00% | 0.00% | 0.00% | 0.00% | 0.00% | 0.00% | 0.00% | 0.00% |
| Ethylene | 35.54% | 36.69% | 0.00% | 38.05% | 47.58% | 28.76% | 33.88% | 54.49% | 75.80% | 83.62% |
| Ethane | 4.17% | 4.54% | 0.02% | 4.60% | 6.18% | 5.39% | 7.63% | 0.03% | 14.30% | 16.26% |
| M-Acetylene | 0.35% | 0.27% | 2.16% | 0.14% | 0.00% | 0.55% | 0.51% | 0.00% | 0.00% | 0.00% |
| Propadiene | 0.36% | 0.31% | 1.90% | 0.16% | 0.00% | 0.63% | 0.59% | 0.00% | 0.00% | 0.00% |
| Propene | 9.59% | 14.06% | 32.25% | 14.52% | 0.03% | 58.45% | 56.53% | 0.00% | 0.07% | 0.08% |
| Propane | 0.16% | 0.22% | 0.64% | 0.22% | 0.00% | 0.89% | 0.84% | 0.00% | 0.00% | 0.00% |
| 13-Butadiene | 1.68% | 0.00% | 28.75% | 0.00% | 0.00% | 0.00% | 0.00% | 0.00% | 0.00% | 0.00% |
| 1-Butene | 1.46% | 0.00% | 24.93% | 0.00% | 0.00% | 0.01% | 0.01% | 0.00% | 0.00% | 0.00% |
| n-Butane | 0.08% | 0.00% | 1.38% | 0.00% | 0.00% | 0.00% | 0.00% | 0.00% | 0.00% | 0.00% |
| C5 & Heavier | 0.55% | 0.00% | 9.36% | 0.00% | 0.00% | 0.00% | 0.00% | 0.00% | 0.00% | 0.00% |

| Stream | 310 | 311 | 312 | 313 | 314 | 315 | 316 | 317 | 318 | 319 |
|---|---|---|---|---|---|---|---|---|---|---|
| Vap. Frac. | 1.00 | 1.00 | 0.00 | 1.00 | 0.00 | 0.00 | 1.00 | 0.00 | 1.00 | 1.00 |
| Temp., F. | -13.1 | 52.9 | 122.3 | -61.8 | -61.8 | -21.8 | -181.4 | -64.1 | 95.0 | -21.7 |
| Pres., Psia | 290.6 | 294.9 | 297.8 | 281.3 | 281.3 | 282.8 | 278.6 | 281.2 | 268.6 | 282.8 |
| Flow, Lbmol/hr | 833 | 538 | 1,019 | 13,869 | 5,764 | 3,050 | 5,408 | 8,462 | 5,408 | 1,086 |
| Flow, Mlb/hr | 23.6 | 17.7 | 42.9 | 292.3 | 154.6 | 85.6 | 66.1 | 226.2 | 66.1 | 30.5 |
| Comp., Mol % | | | | | | | | | | |
| Hydrogen | 0.00% | 0.00% | 0.00% | 10.85% | 0.32% | 0.00% | 27.32% | 0.32% | 27.32% | 0.00% |
| Methane | 0.04% | 0.02% | 0.00% | 34.61% | 9.61% | 0.05% | 72.58% | 10.34% | 72.58% | 0.10% |
| Acetylene | 0.00% | 0.00% | 0.00% | 0.00% | 0.00% | 0.00% | 0.00% | 0.00% | 0.00% | 0.00% |
| Ethylene | 83.23% | 54.33% | 0.00% | 54.53% | 90.03% | 99.90% | 0.10% | 89.31% | 0.10% | 99.87% |
| Ethane | 16.65% | 13.69% | 0.05% | 0.02% | 0.04% | 0.05% | 0.00% | 0.03% | 0.00% | 0.04% |
| M-Acetylene | 0.00% | 0.19% | 0.91% | 0.00% | 0.00% | 0.00% | 0.00% | 0.00% | 0.00% | 0.00% |
| Propadiene | 0.00% | 0.24% | 1.05% | 0.00% | 0.00% | 0.00% | 0.00% | 0.00% | 0.00% | 0.00% |
| Propene | 0.08% | 31.12% | 96.51% | 0.00% | 0.00% | 0.00% | 0.00% | 0.00% | 0.00% | 0.00% |
| Propane | 0.00% | 0.41% | 1.47% | 0.00% | 0.00% | 0.00% | 0.00% | 0.00% | 0.00% | 0.00% |
| 13-Butadiene | 0.00% | 0.00% | 0.00% | 0.00% | 0.00% | 0.00% | 0.00% | 0.00% | 0.00% | 0.00% |
| 1-Butene | 0.00% | 0.00% | 0.01% | 0.00% | 0.00% | 0.00% | 0.00% | 0.00% | 0.00% | 0.00% |
| n-Butane | 0.00% | 0.00% | 0.00% | 0.00% | 0.00% | 0.00% | 0.00% | 0.00% | 0.00% | 0.00% |
| C5 & Heavier | 0.00% | 0.00% | 0.00% | 0.00% | 0.00% | 0.00% | 0.00% | 0.00% | 0.00% | 0.00% |

| Stream | 320 | 321 | 322 | 323 | 324 | 325 | 326 | 327 | 328 | 329 |
|---|---|---|---|---|---|---|---|---|---|---|
| Vap. Frac. | 0.00 | 1.00 | 0.00 | 0.00 | 1.00 | 1.00 | 0.00 | 1.00 | 0.00 | 1.00 |
| Temp., F. | -21.7 | -14.3 | -10.0 | -21.8 | 95.0 | -26.8 | 1.1 | -26.7 | -26.7 | 95.0 |
| Pres., Psia | 282.8 | 294.3 | 295.2 | 282.8 | 1614.7 | 222.2 | 224.9 | 142.9 | 142.9 | 110.0 |

TABLE 3-continued

MATERIAL BALANCE FOR
ETHYLENE RECOVERY FROM PYROLYZED NAPHTHA

| | | | | | | | | | |
|---|---|---|---|---|---|---|---|---|---|
| Flow, Lbmol/hr | 1,438 | 418 | 10,647 | 4,488 | 4,488 | 10,131 | 3,948 | 3,432 | 516 | 516 |
| Flow, Mlb/hr | 40.3 | 11.8 | 305.0 | 125.9 | 125.9 | 289.5 | 118.7 | 103.2 | 15.5 | 15.5 |
| Comp, Mol % | | | | | | | | | | |
| Hydrogen | 0.00% | 0.00% | 0.00% | 0.00% | 0.00% | 0.00% | 0.00% | 0.00% | 0.00% | 0.00% |
| Methane | 0.02% | 0.02% | 0.00% | 0.04% | 0.04% | 0.00% | 0.00% | 0.00% | 0.00% | 0.00% |
| Acetylene | 0.00% | 0.00% | 0.00% | 0.00% | 0.00% | 0.00% | 0.00% | 0.00% | 0.00% | 0.00% |
| Ethylene | 99.93% | 87.92% | 70.72% | 99.91% | 99.91% | 74.30% | 0.82% | 0.86% | 0.49% | 0.49% |
| Ethane | 0.05% | 12.05% | 29.24% | 0.05% | 0.05% | 25.69% | 99.00% | 99.01% | 98.99% | 98.99% |
| M.-Acetylene | 0.00% | 0.00% | 0.00% | 0.00% | 0.00% | 0.00% | 0.00% | 0.00% | 0.00% | 0.00% |
| Propadiene | 0.00% | 0.00% | 0.04% | 0.00% | 0.00% | 0.02% | 0.18% | 0.13% | 0.51% | 0.51% |
| Propane | 0.00% | 0.01% | 0.00% | 0.00% | 0.00% | 0.00% | 0.00% | 0.00% | 0.00% | 0.00% |
| 13-Butadiene | 0.00% | 0.00% | 0.00% | 0.00% | 0.00% | 0.00% | 0.00% | 0.00% | 0.00% | 0.00% |
| 1-Butene | 0.00% | 0.00% | 0.00% | 0.00% | 0.00% | 0.00% | 0.00% | 0.00% | 0.00% | 0.00% |
| n-Butane | 0.00% | 0.00% | 0.00% | 0.00% | 0.00% | 0.00% | 0.00% | 0.00% | 0.00% | 0.00% |
| C5 & Heavier | 0.00% | 0.00% | 0.00% | 0.00% | 0.00% | 0.00% | 0.00% | 0.00% | 0.00% | 0.00% |

The recovery process feed stream 300 has been compressed, treated to remove acid gases, cooled, and dried using conventional technology. In addition to hydrogen, methane, ethylene, ethane, and small amounts of acetylene, it contains significant amounts of propylene and heavier hydrocarbons such as butadiene, isoprene, and benzene. The typical composition is taken from Kniel et. al. (1980). A pressure of about 319 psia is used so that the temperatures in the downstream fractionation steps, represented by the drawing FIGS. T-302, T-303, T-304, T-305, and T-306, will be warm enough to avoid excessively expensive materials of construction and so that the phase equilibria and phase densities allow economic distillation column sizes. However, the process may theoretically be operated at virtually any pressure approaching ambient (20 psia) or the critical pressure of ethane (600 psia).

The feed stream 300 is fractionated in the propane/propylene integrator column T-301 which separates the ethane and lighter gases from the butadiene and heavier hydrocarbons while distributing propane and propylene (and small amounts of methylacetylene and propadiene) between the overhead product stream 301 and the bottom product stream 302. The propane/propylene integrator column T-301 is reboiled using heater E-302 at a temperature low enough to avoid fouling. The bottom product stream 302 contains propylene and heavier hydrocarbons which may be further processed to produce additional products. The butadiene free overhead product stream 301 from the propane/propylene integrator column is heated in heater E-303 to the above ambient temperature required by the acetylene reactor system R-301. The acetylene reactor system R-301 converts an effective amount of the acetylene to ethylene and ethane with removal of the heat of reaction, and some of the methyl acetylene and propadiene is also partially hydrogenated. Cooler E-304 cools the reactor product stream 303 to slightly above its dew point. The propane/propylene integrator column T-301 preferably and optimally has no condenser and is refluxed using recycle stream 305 from the downstream ethane/ethylene integrator column T-302.

Preferably and optimally, about 79% of the propane and propylene is ultimately recovered in the net overhead product and about 21% is recovered in the net bottom product from the propane/propylene integrator column T-301. This distribution of propane and propylene will reduce overall utility and equipment costs to ultimately recover propane and propylene as separate streams.

The ethane/ethylene integrator column T-302 separates methane from propylene while distributing ethane and ethylene between the overhead and bottom product streams 304 and 306 respectively. A liquid side draw stream 305 on or near the feed stage is used to provide reflux to the upstream propane/propylene integrator column. Two intercondensers E-305 and E-306 are used in the ethane/ethylene integrator column T-302 to maximize the temperature at which heat is removed from the process. Preferably and optimally, about 90% of the ethane and ethylene is recovered in the net overhead product and about 10% is recovered in the net bottom product from the ethane/ethylene integrator column T-302.

The ethane/ethylene integrator column T-302 preferably has no condenser and is refluxed using recycle stream 308 from the downstream ethylene integrator distillation column T-303. The ethane/ethylene integrator column T-302 also has no reboiler and is reboiled using recycle stream 311 from the downstream deethanizer distillation column.

The ethylene integrator distillation column T-303 separates methane from ethane while distributing ethylene between the overhead and bottom product streams 307 and 309 respectively. A liquid side draw stream 308 on or near the feed stage is used to provide reflux to the upstream ethane/ethylene integrator column. Preferably and optimally, about 48% of the ethylene in the net feed to the ethylene integrator column T-303 is ultimately recovered in the net overhead product and about 52% is ultimately recovered in the net bottom product. The ethylene integrator column T-303 has no condenser and is refluxed using recycle stream 314 from the downstream demethanizer T-304. The ethylene integrator column T-303 also has no reboiler and is reboiled using combined recycle streams 310 and 321 from the deethanizer T-307 and downstream high pressure ethane/ethylene splitter section T-305 respectively.

The deethanizer T-307 produces a separation of ethane and ethylene in the overhead product stream 310 from propane and propylene in the bottom product stream 312. A vapor side drawstream 311 on or near the feed stage is used to provide reboil vapor to the upstream ethane/ethylene integrator column T-302. A heater E-308 is used to reboil deethanizer T-307, and an intercondenser E-307 is used to partially reflux the deethanizer T-307 at a thermally optimal maximum temperature.

The deethanizer T-307 has no condenser and is refluxed using part of the ethylene integrator column bottom product stream 309. The deethanizer column overhead product stream 310 is used to provide part of the reboil vapor to the ethylene integrator column T-303.

The demethanizer stripping section T-304 separates methane from the bottom product stream 315, and a dephlegmator D-301 is used as the demethanizer column enriching section to separate ethylene from the overhead product stream 316. A liquid side draw stream 314 on or near the feed stage of the demethanizer T-304 provides reflux to the upstream ethylene integrator column. The dephlegmator D-301 allows heat removal at thermally optimal maximum temperatures and improves heat integration. Although not shown, several levels of refrigeration are potentially used in dephlegmator D-301. The demethanizer stripping section T-304 has no reboiler and is reboiled using recycle stream 319 from the high pressure ethane/ethylene splitter section T-305. No hydrogen recovery system is included in the process shown in FIG. 3, and the demethanizer overhead product 316 is reheated in heater E-309 to ambient temperature while providing part of the cooling required in the dephlegmator D-301, ethane/ethylene integrator column intercondensers E-305 and E-306, and propane/propylene integrator column intercondenser E-301. A conventional hydrogen recovery system may be employed using the expansion of the pressure energy of the methane in stream 316 to provide the thermal driving force for separation. In that case two or more product streams containing relatively pure hydrogen and methane at various pressures will be reheated to ambient temperature.

The dual pressure sections of the ethane/ethylene splitter (T-305/T-306) separate ethane in the bottom product stream 328 from ethylene in the overhead product streams 319 and 320. A vapor side draw stream 321 on or near the feed stage provides part of reboil vapor to the upstream ethylene integrator column T-303. The vapor overhead product stream 319 provides reboil vapor to the demethanizer column stripping section T-304, and the liquid overhead product stream 320 is combined with the demethanizer bottom product stream 315 to form the ethylene product stream 323. The ethylene product is pumped in pump P-302 and heated in heater E-311 to pipeline pressure and ambient temperature in stream 324. A two stage open loop heat pump is integrated with the low pressure section of the ethane/ethylene splitter column to optimize heat integration and minimize capital cost. The first heat pump stage comprised of valve V-301, heater E-312, and compressor C-301 provides part of the cooling required in condenser E-310, and the second heat pump stage comprised of valve V-302, heater E-313 and compressor C-302 provides the remainder of the cooling required in condenser E-310. However, a conventional ethane/ethylene splitter using closed loop heat pumping with or without an interreboiler may be used in place of the partitioned ethane/ethylene splitter shown in FIG. 3. The ethane product stream 328 is reduced in pressure through valve V-303 and heated to ambient temperature in E-314.

The objects of the present invention include the use of integrator columns in a cracked gas fractionation train independently of each other. The above specification describes the use of ethylene, ethane/ethylene, propane/propylene, and C3/C4+ integrator columns separately and operating together, although each is not described individually incorporated into a prior art fractionation train. While such individual operation is not separately described herein, the above disclosure is sufficient to the skilled person to inform them of the advantages of such individual or combined operation. Specifically, in the above Summary of the Invention the general advantages of the ethane/ethylene integrator column are described, a detailed description is sufficiently disclosed as part of the process described in FIG. 3 where the propane/propylene integrator column T-301 is removed from the process and the severed thermal coupling therein is replaced with conventional heating and cooling processes.

The concept of a fractionation step has often been conceived in the prior art as consisting of an unpartitioned, single cylindrical column with liquid-vapor contact internals such as trays or packing. FIG. 3 shows an ethane/ethylene splitter whose column has been partitioned into a high pressure upper section and a reduced pressure lower section. The partitioning of the column improves the efficiency of the ethane/ethylene splitter column through the concept of thermomechanical partitioning of the fractionation step into high and low pressure sections. The physical location of the column sections is important in a cost-efficient design, but stacking of column sections may be advantageously done to combine fractionation steps (deethanization, splitting, etc.) or functions within the fractionation steps (rectfication or stripping) to take advantage of short piping runs and thereby reduce costs.

Thus, the various sections of one or more fractionation steps may be physically stacked together and integrated as a single column. As a specific example, the hydrogen-processing enriching or rectification sections of the fractionation steps in ethylene purification may advantageously be stacked into one physical column. Analogously, the methane-processing stripping sections of those fractionation steps may also be advantageously stacked into one physical column.

It is one of the outstanding objects of the present invention to provide a new location for the deethanization step in ethylene recovery. In the prior art, the deethanization step must separate all the ethane and ethylene in a cracked gas from heavier components. In the present invention, as shown in FIG. 3, only a relatively small portion of the ethane and ethylene ultimately recovered are fractionated in the deethanizer T-307. The function and energy needs of the deethanization are shifted to higher efficiency fractionation steps. Where C3+ fractionation is needed in ethylene recovery, the thermal linking of the deethanizer with the ethylene integrator and ethane/ethylene integrator columns as shown in FIG. 3 reduces deethanizer column size and uses a single reboiler, heater E-308, to provide reboiling duty to three fractionation steps in T-307, T-302, and T-303.

Figure 4:
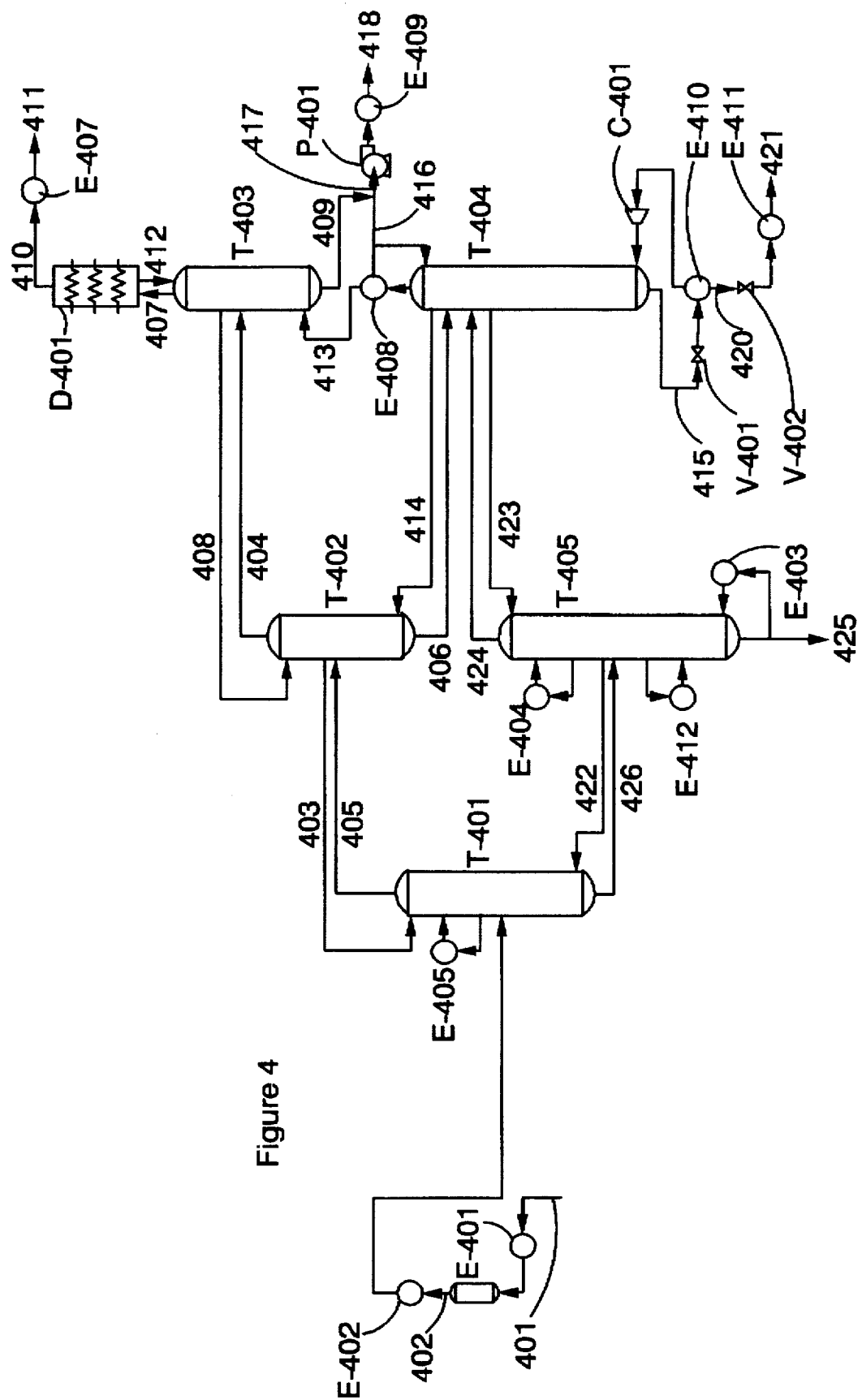
FIG. 4 generally shows the present invention processing cracked gas made from ethane and a substantial amount of propane. A deethanizer is added to the preferred fractionation steps shown in FIG. 2 to accomplish C3+ component separation from a relatively small portion ethane and ethylene, in the absence of hydrogen and methane.
Figure 5:
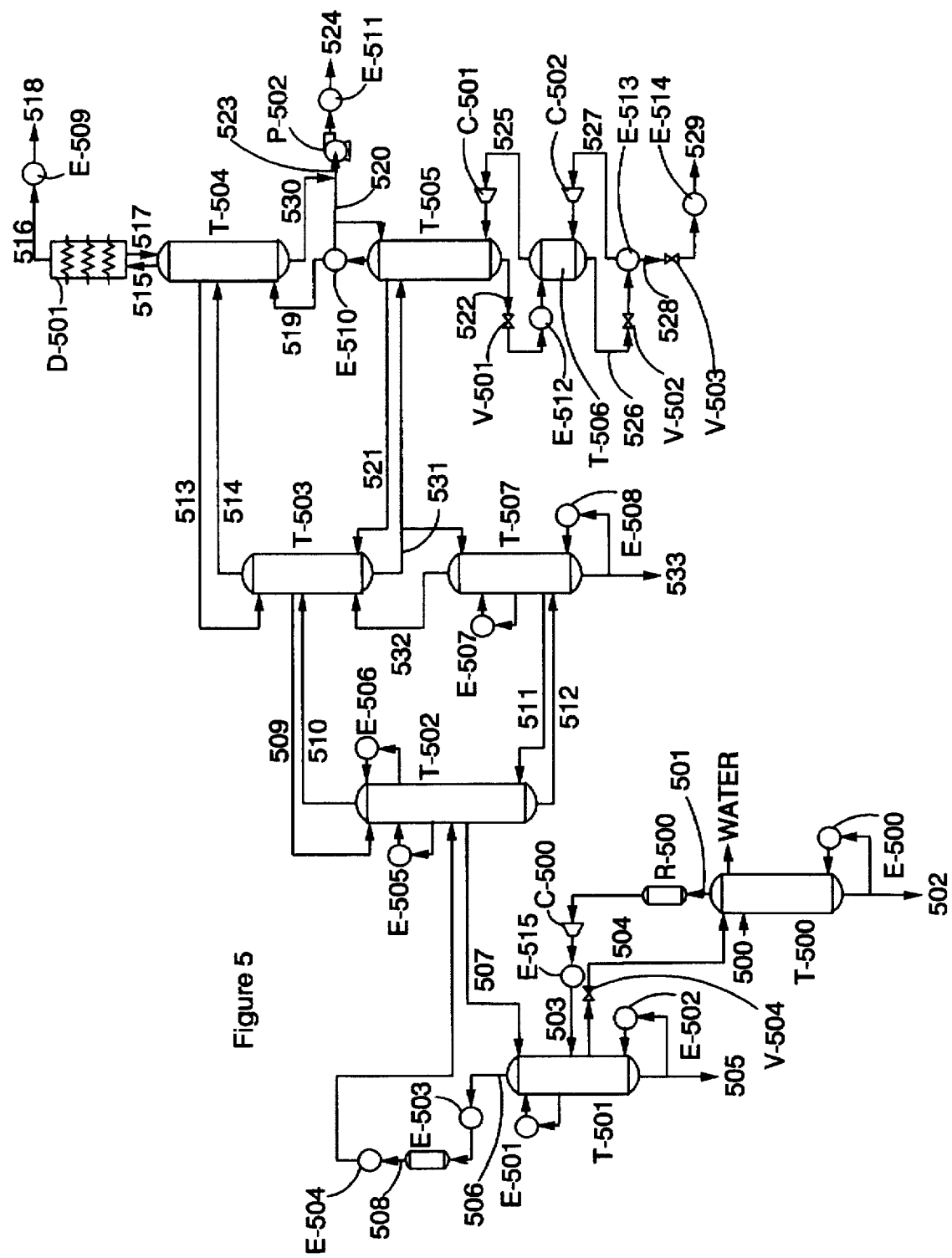
FIG. 5 generally shows the present invention processing cracked gas made from gas oil. A C3/C4+ integrator column is added to the preferred fractionation steps shown in FIG. 3 to accomplish distribution of C4 components in the overhead and bottoms streams.

FIGS. 4 and 5 describe important variations of the invention. When cracked gas is made from an ethane/propane mixture or gas oil, FIGS. 4 and 5 respectively show how the present invention would be adapted to most efficiently process those cracked gases.

FIG. 4 shows an embodiment most useful when C4+ components are but a small proportion of the cracked gas compared with those proportions found in cracked gas made from naphtha. An ethane/ethylene integrator column T-401 generates an overhead vapor stream substantially free of C3+ components and comprises a substantial portion but less than all of the ethane and ethylene in the cracked gas, roughly comparable to the distribution made of those components in the process described in FIG. 3. The overhead vapor stream from the ethane/ethylene integrator column T-401 is further fractionated in the ethylene integrator column T-402 according to the process described for FIGS. 2 and 3. The distinctive change made in this embodiment different from the process described in FIG. 2 (for fractionating a cracked gas made substantially from ethane) is the addition of a deethanizer T-405. Stream 422, the liquid bottoms stream of the ethane/ethylene integrator column T-401, is deethanized to separate the C3+ components. This change has dramatically reduced the capital and energy cost of prior art deethanization—no longer is the hydrogen or methane passed through the deethanizer and the deethanizer condenser is optionally eliminated by refluxing deethanizer T-405 with a liquid side draw from the ethane/ethylene splitter T-404. In addition, the bulk of the ethane and lighter components are separated from the C3+ components in the high-efficiency ethane/ethylene integrator column T-402. For these reasons, the deethanization necessary for ethylene purification from cracked gas made from ethane and propane is reduced in cost in the present invention by reducing column diameter, using lower cost metallurgy for column materials, elimination of the deethanizer condenser, and lowering refrigeration utilities through high-efficiency thermal coupling of the deethanization to other fractionation steps. It will be apparent to the skilled person from the disclosure of the processes described in FIGS. 2 and 3 that the deethanizer T-405 shown in FIG. 4 further thermally integrates the necessary fractionation steps for ethylene purification when substantial amounts of C3+ components are present in the gas stream to be processed, although the proportions of some of the vapor components are somewhat different from those of cracked gas made from ethane.

It is known that the hydrogen content of cracked gases made from ethane differ substantially from cracked gas made with ethane and propane. Such a change does not interfere with the objects of the present invention as shown in FIGS. 2 and 4. The fractionation of cracked gas made from ethane (which is proportionally higher in hydrogen than cracked gas from ethane and propane) is fully described in the embodiment for FIG. 2. The reduction of hydrogen in cracked gas made from ethane and propane generally results in reducing very low level refrigeration needs for demethanization. The above discussion of the embodiment shown in FIG. 4 therefore adequately describes the adaptation of the process shown in FIG. 2 to that shown in FIG. 4.

FIG. 5 shows an embodiment most useful when cracked gas has been made from gas oil, an embodiment already substantially described in the Summary of the Invention section. The C3/C4+ integrator column T-500 first generates an overhead vapor stream substantially free of C5+ components and comprises a substantial portion but less than all of the C4 components in the cracked gas. The overhead vapor stream from the C3/C4+ integrator column T-500 is further fractionated in a propane/propylene integrator column T-501 whose overhead vapor stream is substantially free of C4+ components and comprises a substantial portion but less than all of the propane and propylene in the cracked gas. As shown in FIG. 5, the cracked gases may be advantageously dried after the C3/C4+ integrator column as the overhead temperatures will generally be high enough to preclude hydrate formation.

It is apparent to the skilled person from the disclosure of the processes described in FIGS. 2, 3, and 4 that the C3/C4+ integrator column shown in FIG. 5 further thermally integrates the necessary fractionation steps for ethylene purification when substantial amounts of C4+ components are present in the gas stream to be processed, although the proportions of some of the vapor components are somewhat different from those of cracked gas made from naphtha.

FIGS. 2-5 show alternate configurations for the supply of reboiling vapor from the deethanizer and the side drawn vapor streams from the ethane/ethylene splitter to the ethylene integrator column. The preferred embodiment of the supply of reboiling vapor for the ethylene integrator column may change with specific optimizations of the present invention. Changes in equipment and utilities costs or pyrolysis furnace conditions may change the desirability of one embodiment of the ethylene integrator column reboiling design over another showing the feed-type of the cracked gas. The embodiments in FIGS. 2-5 for such reboiling is exemplary, reflecting a set of conditions and assumptions of utility and equipment costs that change frequently. Such frequent changes do not limit the concept of the present invention.

We claim:

1. A process for fractionation of a mixture of light hydrocarbons containing at least hydrogen, methane, ethylene, and ethane and optionally propylene and heavier hydrocarbons comprising:
   (a) achieving a product-quality separation of at least a portion of the light hydrocarbons comprising hydrogen, methane, ethylene and ethane in a first integrator column to produce a first overhead stream and a first bottoms stream;
   (b) fractionating the first overhead stream to produce a second bottoms stream comprising substantially a portion of a single component of one of said light hydrocarbons; and
   (c) fractionating the first bottoms stream separately from the first overhead stream to produce a second overhead stream comprising substantially the remaining portion of the said single light hydrocarbon component in (b).

2. The process of claim 1 wherein the ethylene is the single light hydrocarbon.

3. The process of claim 2 wherein the first overhead stream is fractionated in a demethanizer, the first bottom stream is fractionated in a ethane/ethylene splitter, and the first integrator column is an ethylene integrator column.

4. The process of claim 3 wherein a demethanizer liquid sidestream provides reflux to the ethylene integrator column.

5. The process of claim 4 wherein an intercondenser is provided in the demethanizer.

6. The process of claim 5 wherein ethylene is recovered from a hydrogen-rich stream by dephlegmation in association with the demethanizer.

7. The process of claim 4 wherein a first portion of the overhead vapor from the ethane/ethylene splitter is fed to the bottom of the demethanizer as reboiling vapor and a second portion is withdrawn as ethylene product.

8. The process of claim 6 wherein a sidedraw vapor stream from the ethane/ethylene splitter is fed to the bottom of the ethylene integrator column as reboiling vapor.

9. The process of claim 6 wherein the ethane/ethylene splitter is provided with an interreboiler.

10. The process of claim 8 wherein the interreboiler is an open loop heat pumped refrigeration system partitioning the ethane/ethylene splitter into an upper high pressure section and a reduced pressure lower section.

11. The process of claim 3 wherein the mixture of light hydrocarbons is first fractionated in a deethanizer whose overhead stream is fed to the ethylene integrator column.

12. The process of claim 11 wherein the reflux to the deethanizer is provided entirely or in part from a side draw liquid stream from the ethylene integrator column.

13. The process of claim 3 wherein:
   (a) the mixture of light hydrocarbons is first fractionated in an ethane/ethylene integrator column whose overhead vapor stream is substantially free of C3+ components and comprises a substantial portion but less than all of the ethane and ethylene in the mixture of light hydrocarbons;
   (c) feeding the overhead vapor stream of the ethane/ethylene integrator column to the ethylene integration column;
   (d) fractionating the liquid bottoms stream of the ethane/ethylene integrator column in a deethanizer, whose overhead vapor stream is fractionated in the ethane/ethylene splitter; and
   (e) fractionating the liquid bottoms stream of the ethane/ethylene integrator column in the ethane/ethylene splitter.

14. The process of claim 13 wherein the mixture of light hydrocarbons is cracked gas from ethane and a substantial amount of propane.

15. The process of claim 3 wherein:
   (a) the mixture of light hydrocarbons is first fractionated in a propane/propylene integrator column whose overhead vapor stream is substantially free of C4+components and comprises a substantial portion but less than all of the propane and propylene in the mixture of light hydrocarbons;
   (b) fractionating the overhead vapor stream of the propane/propylene integrator column in an ethane/ethylene integrator column whose overhead vapor stream is substantially free of the C3+ components and comprises a substantial portion but less than all of the ethane and ethylene in the mixture of light hydrocarbons;
   (c) feeding the overhead vapor stream of the ethane/ethylene integrator column to the ethylene integration column;
   (d) fractionating the liquid bottoms stream of the ethane/ethylene integrator column and optionally part of the liquid bottoms stream of the ethylene integrator column in a deethanizer, whose overhead vapor stream is fed to the ethylene integrator column; and
   (e) fractionating all or part of the liquid bottoms stream of the ethane/ethylene integrator column in the ethane/ethylene splitter.

16. The process of claim 15 wherein the mixture of light hydrocarbons is cracked gas from naphtha.

17. The process of claim 1 wherein:

(a) the mixture of light hydrocarbons is first fractionated in a C3/C4+ integrator column whose overhead vapor stream is substantially free of C5+ components and comprises a substantial portion but less than all of the C4 components in the mixture of light hydrocarbons;

(b) the mixture of light hydrocarbons is fractionated in a propane/propylene integrator column whose overhead vapor stream is substantially free of C4+ components and comprises a substantial portion but less than all of the propane and propylene in the mixture of light hydrocarbons;

(c) fractionating the overhead vapor stream of the propane/propylene integrator column in an ethane/ethylene integrator column whose overhead vapor stream is substantially free of the C3+ components and comprises a substantial portion but less than all of the ethane and ethylene in the mixture of light hydrocarbons;

(d) feeding the overhead vapor stream of the ethane/ethylene integrator column to the ethylene integration column;

(e) fractionating the liquid bottoms stream of the ethane/ethylene integrator column and optionally part of the liquid bottoms stream of the ethylene integrator column in a deethanizer, whose overhead vapor stream is fed to the ethylene integrator column to provide reboiling duty; and (f) fractionating all or part of the liquid bottoms stream of the ethane/ethylene integrator column in the ethane/ethylene splitter.

18. The process of claim 17 wherein the mixture of light hydrocarbons is cracked gas from gas oil.

19. The process of claims 13, 15, or 17 wherein the reboiling duty of the ethylene integrator column is at least in part supplied by a side drawn vapor from the ethane/ethylene splitter and optionally in part supplied from the overhead vapor stream of the deethanizer.

20. The process of claim 1 wherein a net ethylene product is substantially obtained only from the overhead vapor of the ethane/ethylene splitter and reflux to the ethane/ethylene splitter is obtained at least in part from a liquid bottom from the demethanizer.

21. The process of claims 13, 15, or 17 wherein the reflux duty of the deethanizer is supplied at least in part by a side drawn liquid from the ethane/ethylene splitter and optionally supplied in part by a bottoms liquid stream from the ethylene integrator column.

* * * * *

UNITED STATES PATENT AND TRADEMARK OFFICE
CERTIFICATE OF CORRECTION

PATENT NO. : 5,675,054
DATED     : October 7, 1997
INVENTOR(S) : Manley et al.

It is certified that error appears in the above-indentified patent and that said Letters Patent is hereby corrected as shown below:

```
Column 27, in claim 17, line 1:  the term "claim 1" should
     read --claim 3--.
Column 28, in claim 20, line 1:  the term "claim 1" should
     read --claim 3--.

Column 25, in claim 3, line 2:  the term "first bottom"
     should read --first bottoms--.
Column 25, in claim 3, line 3:  the term "in a" should
     read --in an--.
```

Signed and Sealed this

Second Day of June, 1998

*Attest:*

BRUCE LEHMAN

*Attesting Officer*     Commissioner of Patents and Trademarks